(12) United States Patent
Ilsar

(10) Patent No.: US 6,694,487 B1
(45) Date of Patent: *Feb. 17, 2004

(54) MULTI-COLUMN PAGE PREVIEW USING A RESIZING GRID

(75) Inventor: Eyal David Ilsar, Be'er Sheva (IL)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/208,405

(22) Filed: Dec. 10, 1998

(51) Int. Cl.$^7$ .............................................. G06F 17/21
(52) U.S. Cl. ....................... 715/527; 715/505
(58) Field of Search ................. 345/661, 801, 345/798, 428, 660, 663, 665; 707/521, 527; 715/521, 527, 505, 507, 509

(56) References Cited

U.S. PATENT DOCUMENTS

| | | | | |
|---|---|---|---|---|
| 4,295,135 A | * | 10/1981 | Sukonick | 707/527 |
| 5,404,316 A | * | 4/1995 | Klingler et al. | 707/530 X |
| 5,652,901 A | * | 7/1997 | Slayden et al. | 707/527 |
| 5,732,230 A | * | 3/1998 | Cullen et al. | 345/629 |
| 6,034,684 A | * | 3/2000 | Proehl et al. | 345/764 |
| 6,128,633 A | * | 10/2000 | Michelman et al. | 707/527 X |

* cited by examiner

Primary Examiner—Stephen S. Hong
(74) Attorney, Agent, or Firm—Fitzpatrick, Cella, Harper & Scinto

(57) ABSTRACT

A method of previewing an electronic document using display device forming part of a computer system intended for printing is disclosed. An electronic document having at least one printable page is provided and formed into a print preview representation of at a default preview size. A grid is formed and associated with the representation, the grid having cells corresponding to individual pages at said default preview size. The representation is displayed on the display device with the grid overlying said representation. Using at least one input device of the computer system, a part of the arid is selected. The selected part is moved to cause a change in size of the grid such that an aspect ratio of said cells formed by said grid remains constant. On de-selecting the grid, a further print preview representation of the page is formed at a preview size corresponding to that of the change in the grid.

63 Claims, 13 Drawing Sheets

FIG. II

MULTI-COLUMN PAGE PREVIEW USING A RESIZING GRID

FIELD OF THE INVENTION

The present invention relates to paging preview displays used in interactive computer systems and, in particular, discloses an arrangement by which a user may conveniently tailor the page preview display to suit individual requirements.

BACKGROUND ART

Most computer-based applications which incorporate a tool for printing information in document form also provide a previewing facility that allows the user to view, usually on a video display device or the like, a representation of the page to be printed before it is actually output to the printer for hard copy reproduction. Such tools typically incorporate a preview area on the display screen that implements a "What You See Is What You Get" (WYSIWYG) printing interface. Within this area, a preview version of the page to be rendered is displayed and which corresponds to the intended printed page(s). The pages are usually previewed one or two at a time so that the user can view the fine details at screen resolution, which is typically 72 dpi compared to usual printers resolution of 300 dpi or better.

FIG. 1 shows a window 1 that may be typically encountered when using the WORD FOR WINDOWS (Trade Mark Microsoft Corporation) word processing software application. The window 1 is shown after the user has selected a "print preview" function whereby two pages 2 and 3 of the document being produced are represented within a display area 4 in a side-by-side relationship. Microsoft Word also allows the user to switch between one page and two page print preview. FIG. 1 shows the print previews substantially filling the display area.

In some versions of Microsoft Word, for example Microsoft Word 97, the print preview display also provides the user with an array of zoom settings which are selectable by means of a drop-down sub-window 5 also seen in FIG. 1. Such applications permit the user to select one of a predetermined number of zoom ratios preset by the software application. For example, Word 97 offers the selectable ratios of 500%, 200%, 150%, 100%, 75%, 50%, 25%, 10%, "page width", "whole page", and "two pages". In the example indicated in FIG. 1, it is noted that selecting "two pages" equates to a zoom ratio automatically of 37% as indicated. As a consequence, the user is often constrained within predetermined zoom ratios for print preview.

In some applications, the user may specify his own preview ratio. This requires specific data entry (typing) of the zoom ratio desired (eg. say, 17.5%) in the Word 97 example mentioned above. Whilst such print previewing may be accurately represented, it is difficult without some amount of trial and error for a user to accurately select a desired zoom ratio to achieve a desired transient reproduction.

Other computer applications provide alternatives and the most common alternative is the tiling of individual page previews within the preview area. This facilitates the display of as many pages as possible in a single viewing,. An example of this is seen in FIG. 2 where a particular small zoom ratio (eg. 10%) may be selected such that a number of pages 6, 7, 8, 9, 10 and 11 appear tiled within the display area 4. Notably, and as seen in FIG. 2, not all pages are fully displayed (eg. pages 9, 10 and 11) in which case, a scroll bar 12 may be provided to permit the user to scroll through the electronic document as it is displayed within the window 4 to view the whole print preview for each of the partly shown or wholly obscured pages 9, 10 and 11. Again, the user is constrained to operate within a specified number of zoom ratios.

Further, a printing tool that prints a collection of documents as a single printout requires to address the user's preferences with respect to the presentation of the overall collection, as well as each individual document. This is particularly important when the content of such documents can span multiple pages. Examples of this occur in hypertext documents which may be generated using advanced word processing packages, and/or web-browsing document formatting packages. In such collections, the layout of individual documents is dictated by the pages boundaries and may be affected by its position within the collection.

It is also known to be able to select the boundaries of an application program window, such as the edge 13 of the window shown in FIG. 2 and to manipulate the size of the window by moving the edge. The same can also be accomplished by selecting a corner of a window. When this is a performed in a print preview mode, this may cause, where the window is enlarged, further pages to be previewed (eg. tiling), but where the window size is reduced, the preview can be become truncated and exceed the boundaries of the window and thus not be appropriately displayed. The user must then manually select an appropriate zoom setting, if indeed that feature is available.

Accordingly, there exists a need for an alternative means for creating a print preview which may be easily tailored by the user to provide a desired representation of the document at hand.

SUMMARY OF THE INVENTION

In accordance with one aspect of the present invention there is disclosed a method of altering the presentation of an image represented by a display, said method comprising the steps of:

establishing a matrix of display cells within each of which at least part of a visual object is displayable, each of said display cells having a first configuration in which at least part of one of said cells forms said image;

selecting a component at a first position within said matrix and forming part of said image and moving said component to a second position in said matrix;

determining from the movement of said component an extent of change of said first configuration; and applying the extent of change to the display cells to alter their presentation to a second configuration.

In accordance with another aspect of the present invention there is disclosed a method of previewing an electronic document intended for printing, said method comprising the steps of:

providing an electronic document having at least one printable page;

creating a print preview representation of said one page and displaying the representation in a first format;

creating a boundary at an edge of said one page and displaying said boundary over said representation;

selecting a component of the representation and moving the component within the display to cause an alteration of said representation to a second format.

In accordance with another aspect of the present invention there is disclosed a method of previewing an electronic document using display device forming part of a computer system intended for printing, said method comprising the steps of:

(a) providing an electronic document having at least one printable page;

(b) forming a print preview representation of said one page at a default preview size;

(c) forming a grid associated with said representation and having cells corresponding to individual pages at said default preview size;

(d) displaying on said display device said representation and said grid with said grid overlying said representation;

(e) selecting using at least one input device of said computer system, a part of said grid and moving the selected part to cause a change in size of said grid such that an aspect ratio of said cells formed by said grid remains constant;

(f) de-selecting said grid and forming a further print preview representation of said one page at a preview size corresponding to that of said change in said grid.

In accordance with another aspect of the present invention there is disclosed

Other aspects of the invention, including apparatus for performing the invention and computer program products related to the same, are also disclosed.

BRIEF DESCRIPTION OF THE DRAWINGS

A number of embodiments of the present invention will now be described with reference to the drawings in which.

DESCRIPTION OF THE PREFERRED EMBODIMENT

The preferred embodiment of the present invention is described as a computer application program hosted on the Windows™ operating system developed by Microsoft Corporation. However, those skilled in the art will recognise that the described embodiment may can be implemented on computer systems hosted by other operating systems. For example, the preferred embodiment can be performed on computer systems running UNIX™, OS/2™, DOS™. The application program has a user interface which includes menu items and controls that respond to mouse and keyboard operations. The application program has the ability to transmit data to one or more printers either directly connected to a host computer or accessed over a network. The application program also has the ability to transmit and receive data to a connected digital communications network (for example the "Internet").

Figure 11:
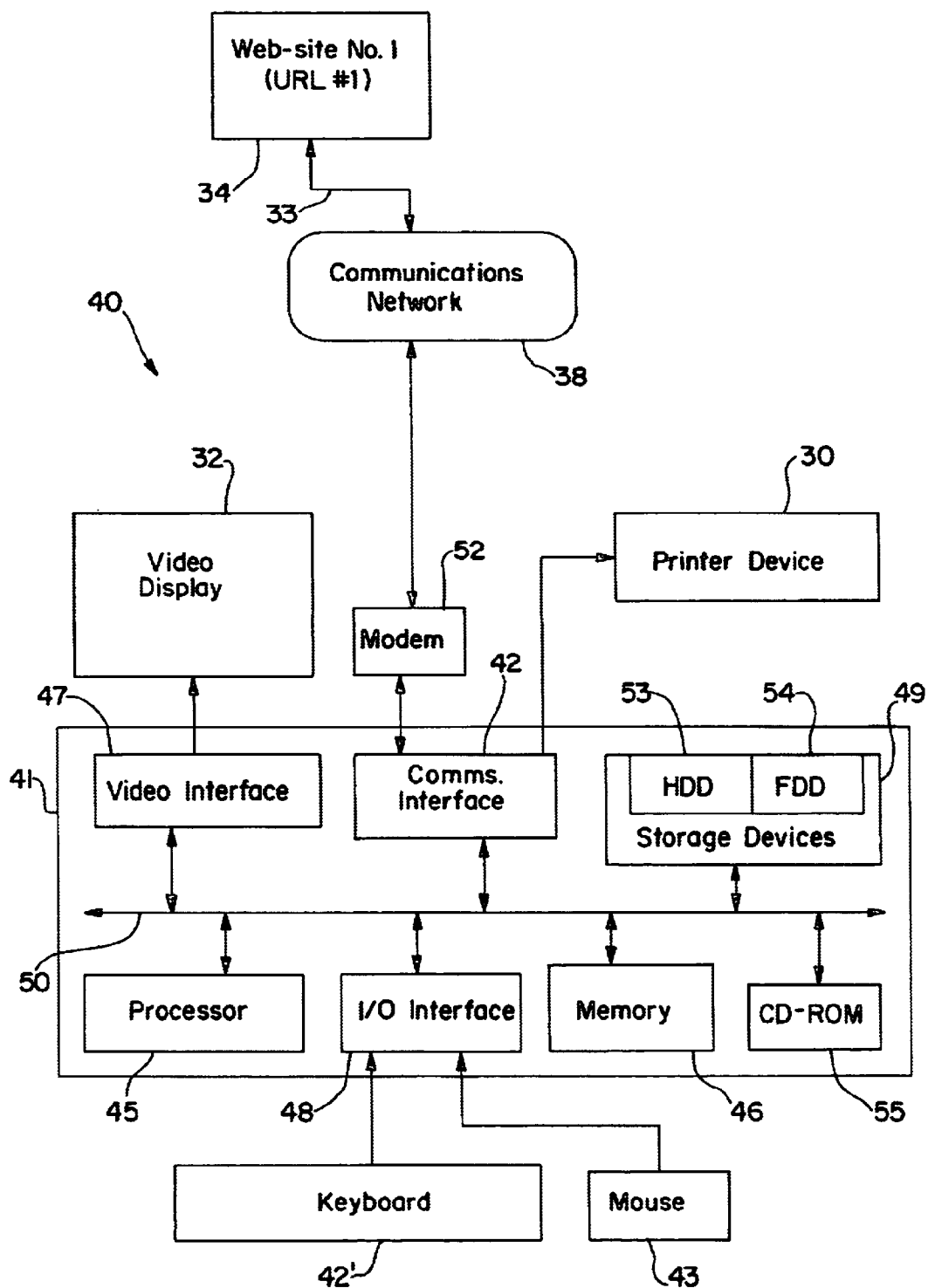
FIG. 11 is a schematic block diagram representation of a computer system in which the various embodiments may be implemented.

The preferred embodiment of the invention can be practised using a conventional general-purpose (host) computer system, such as the computer system 40 shown in FIG. 11, wherein the application program discussed above and to be described with reference to the other drawings is implemented as software executed on the computer system 40. The computer system 40 comprises a computer module 41, input devices such as a keyboard 42' and mouse 43, and output devices including a printer 13 and a display device 11. A Modulator-Demodulator (Modem) transceiver device 52 is used by the computer module 41 for communicating to and from a communications network 38, for example connectable via a telephone line or other functional medium. The modem 52 can be used to obtain access to the Internet, and other network systems, such as a web-site 34.

The computer module 41 typically includes at least one processor unit 45, a memory unit 46, for example formed from semiconductor random access memory (RAM) and read only memory (ROM), input/output (I/O) interfaces including a video interface 47, a communications interface 42, and an I/O interface 48 for the keyboard 42' and the mouse 43. A storage device 49 is provided and typically includes a hard disk drive 53 and a floppy disk drive 54. A CD-ROM drive 55 is typically provided as a non-volatile source of data. The components 45 to 49 and 53 to 55 of the computer module 41, typically communicate via an interconnected bus 50 and in a manner which results in a conventional mode of operation of the computer system 40 known to those in the relevant art. Examples of computers on which the embodiments can be practised include IBM-PC's and compatibles, Sun Sparcstations or alike computer systems evolved therefrom. Typically, the application program of the preferred embodiment is resident on a hard disk drive 53 and read and controlled using the processor 45. Intermediate storage of the program and the print list and any data fetched from the network may be accomplished using the semiconductor memory 46, possibly in concert with the hard disk drive 53. In some instances, the application program may be supplied to the user encoded on a CD-ROM or floppy disk, or alternatively could be read by the user from the network 38 via the modem device 52.

Figure 2:
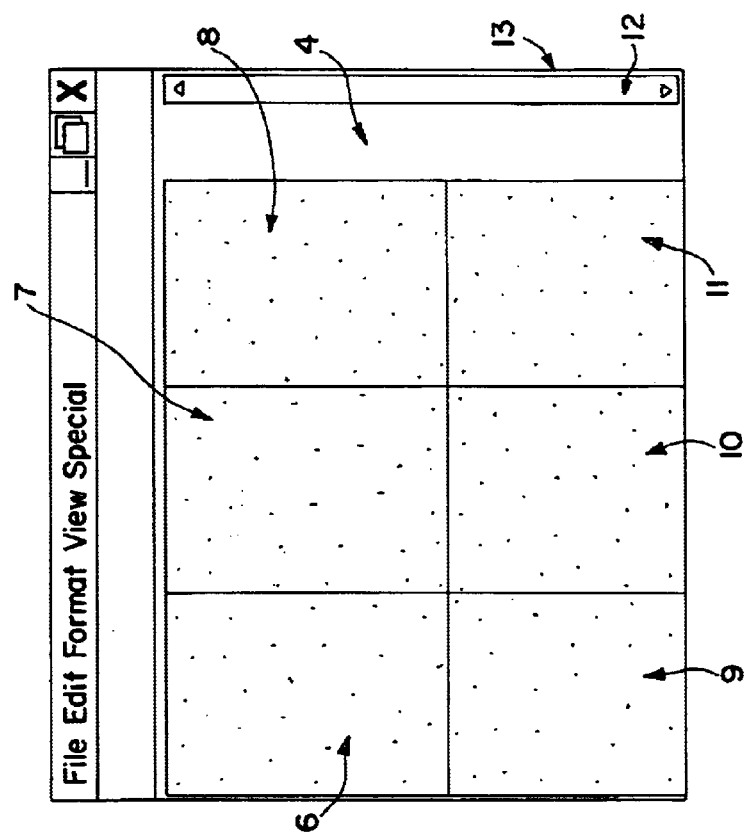
FIGS. 1 and 2 illustrate print preview formats found in prior art arrangements.
Figure 1:
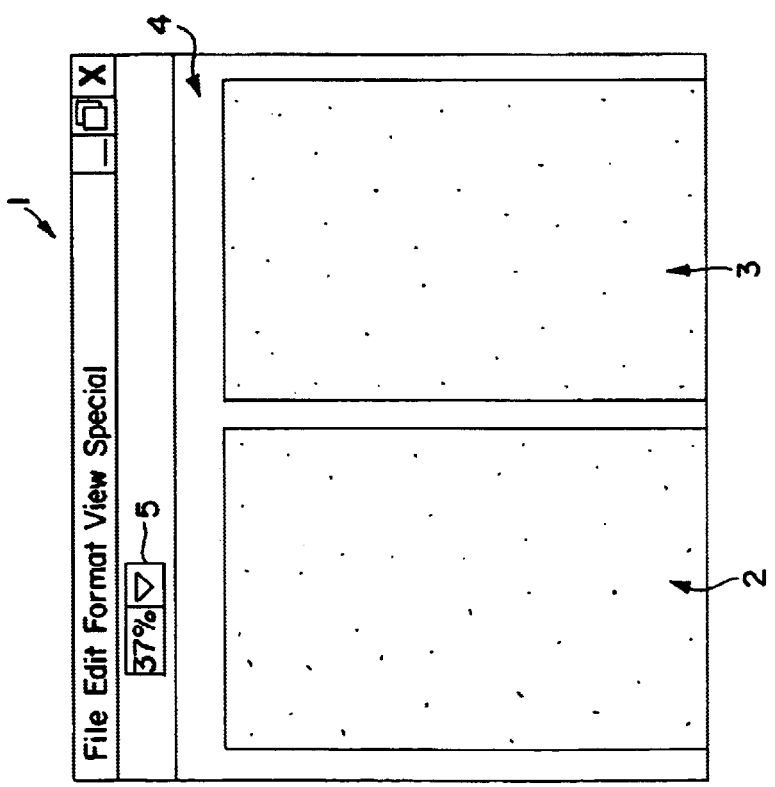

The various embodiments to be described with reference to FIGS. 3 to 10 each are described as taking place within a window typically displayed on the screen of the video display 32 in a form similar to that shown in FIGS. 1 and 2. However, for the sake of simplicity, some components of the window display have been omitted as such would be considered well known to those skilled in the art. In particular, in FIGS. 3 to 10, the display area 100 illustrated corresponds in function to the display area 4 of each of FIGS. 1 and 2.

Figure 3:
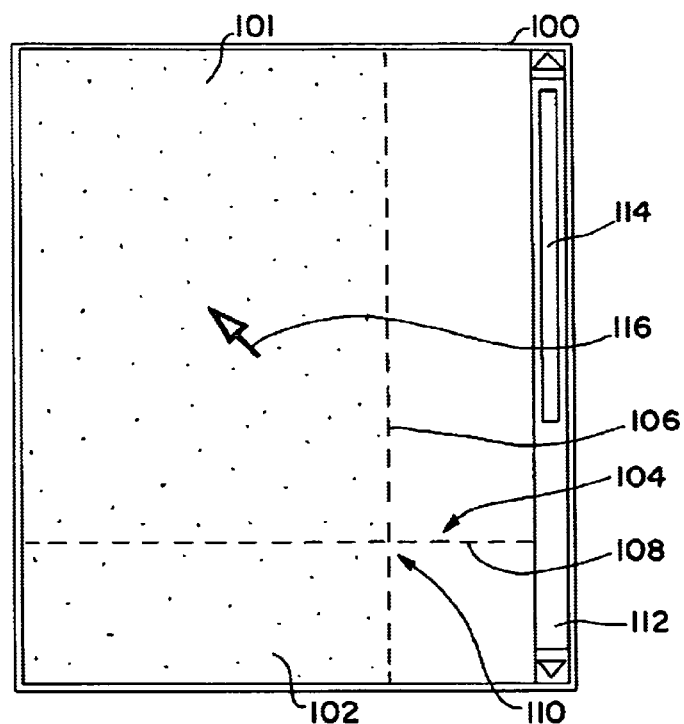
FIG. 3 illustrates an initial state of a print preview function in accordance with the preferred embodiment.

FIG. 3 shows the display area 100 after initiation of a print preview function in accordance with the preferred embodiment. In the described embodiment, the document being developed, for the sake of illustration, is a two-page document which is rendered as print preview pages 101 and 102, respectively. When the print preview function is instigated, a print preview display is created in a first format at a default zoom ratio which, as seen in FIG. 3, is sufficient to display all of one page, but parts of other pages within the display area 100. This for example may equate to a zoom ratio of approximately 35% where the display area 100 is of a size comparable to a full screen application such as those of FIGS. 1 and 2. As seen, the print preview pages 101 and 102 are displayed in a tile-like format separated by a grid 104 incorporating at least one vertical grid line 106 and one horizontal grid line 108. Specifically, it is desired that the initial zoom ratio be such that at least one grid intersection 110 be visible to the user. The display area 100 also includes a vertical scroll bar 112 which, in this case, by virtue of there being more than one print preview page, is active and thus incorporates a slider 114 selectable using a mouse pointer 116 controllable using the mouse 43 for viewing the preview of page 102. In practice, the initial print preview display may be formed in a conventional manner with the grid being substantially simultaneously and separately generated and displayed to overlay the initial print preview. Alternatively, the generation of the print preview and the grid may be unitarily and simultaneously performed.

Figure 4:
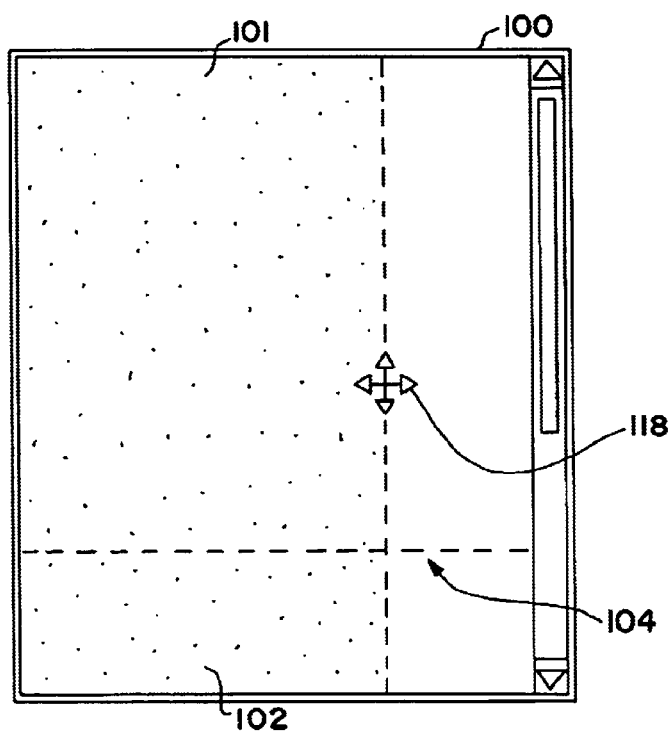
FIG. 4 indicates a second state following that shown in FIG. 3.

Turning now to FIG. 4, the user may commence adjustment of the print preview display by moving the mouse pointer 116 over the grid 104 until such time as the mouse pointer 116 changes shape indicative of it being positioned directly above the grid 104 and thus able for the grid 104 to be selected for user manipulation. In this case, the mouse pointer 116 changes its representation to a cruciform pointer 118 representative of a capacity to move in the two dimensions of the display area 100.

Figure 5:
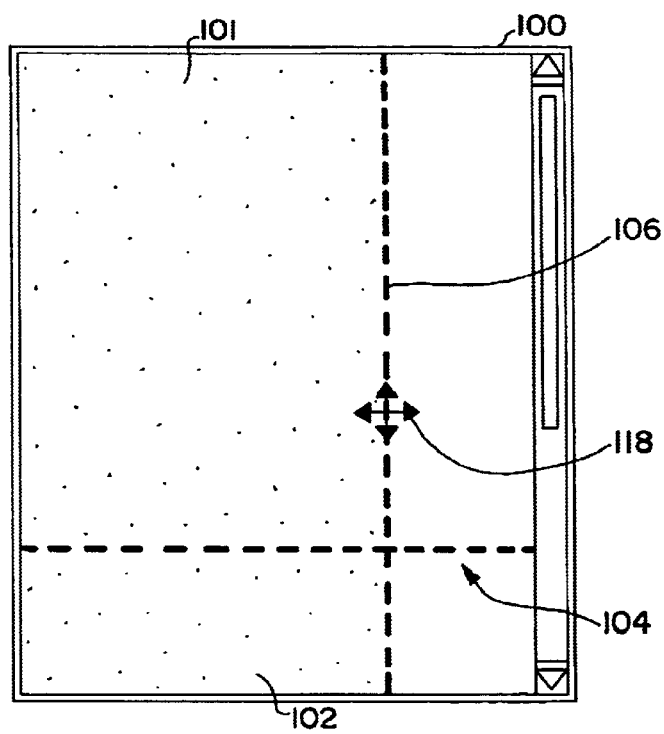
FIG. 5 illustrates a third state following that shown in FIG. 4.

As seen in FIG. 5, the cruciform pointer 118 may be snapped to the grid 104 by the user depressing, and holding depressed, a left button traditionally incorporated upon the mouse 43. Such action causes the cruciform pointer 118 and the grid 104 to become active, and this being seen in FIG. 5 (compared to FIGS. 3 and 4) by virtue of the cruciform pointer 118 being shown darkly shaded and the grid 104 changing its outline as can be made to occur in specific implementations. At this time, the user may move the cruciform pointer 118 to achieve a resizing of the grid 104. In particular, as seen in FIGS. 4 and 5, the cruciform pointer 118 is positioned over the active vertical grid line 106, and as such, movement of the pointer 118 along the grid line 106 does not cause a resizing of the grid 104. Conversely, movement of the pointer 118 perpendicular to the grid line 106 will cause a widening or narrowing of the grid 104 thus causing resizing.

Figure 6:
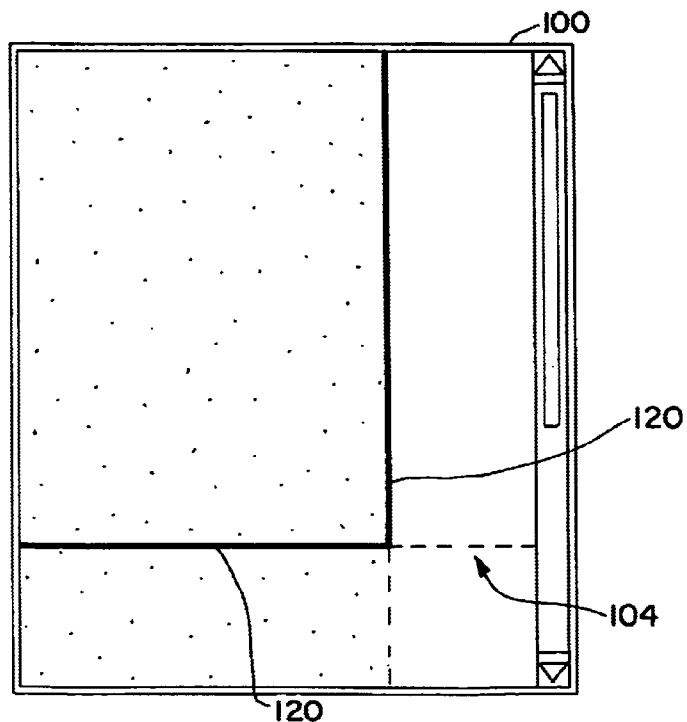
FIG. 6 illustrates a locus of pointer movement during the state of FIG. 5.

FIG. 6 shows in this connection a locus of points 120 upon which movement of the pointer 118 does not cause resizing of the grid 104.

Figure 7:
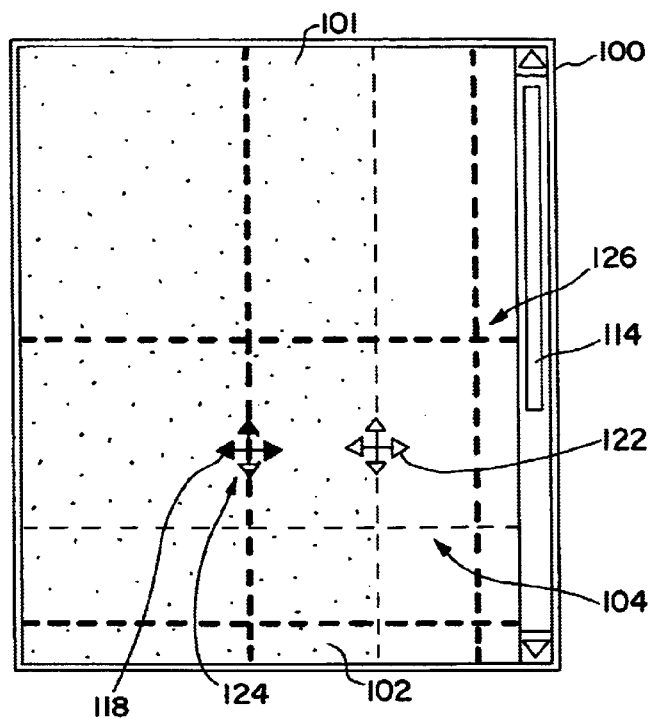
FIG. 7 illustrates a further state following from that of FIG. 5.

Turning now to FIG. 7, the effect of the above noted perpendicular movement of the cruciform pointer 118 is illustrated in comparison to the print preview of pages 101 and 102 that remain displayed in their initial state determined by the original grid 104. However, movement of the cruciform pointer 118 from its initial position 122 to a final position 124 acts to create a new, resized grid 126 whose width is determined by the position of the cruciform pointer 118. In particular, and as illustrated in FIG. 7, the size of the grid maintains the height-to-width ratio of the print preview page with that of the initial print preview seen in FIG. 3. In this fashion, by the user depressing the mouse button and dragging the pointer 118 causes the grid to change from a grid 104 displaying essentially a single print preview page 101, to a new grid 126 able to, in this example, display at least four print preview pages.

Figure 8:
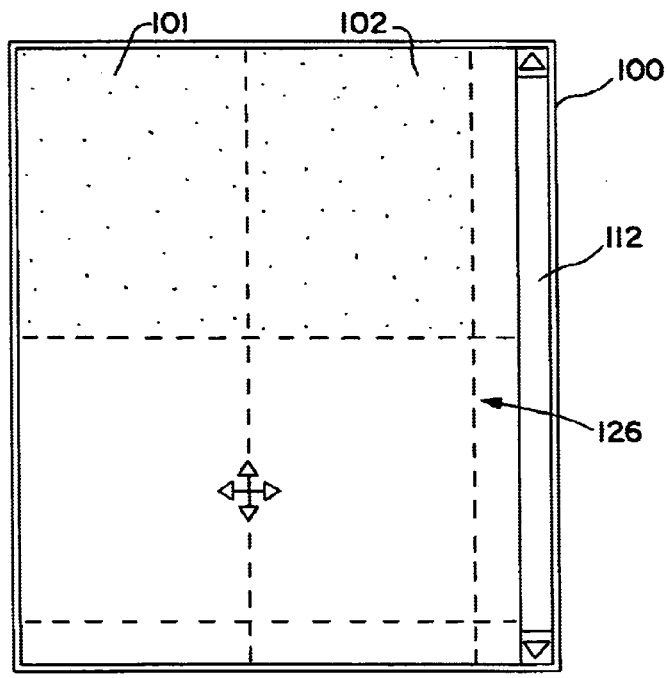
FIG. 8 represents a final state of the print preview of FIGS. 3 to 7.

FIG. 8 shows the state of the display area 100 after the user releases the depressed button on the mouse 43 which causes the print preview pages 101 and 102 to be automatically displayed in a second format within the new resized grid 126. Further, because the mouse button has been released, the cruciform pointer 118 now becomes inactive as it hovers over the new inactive grid 126, again indicated by the change of representation thereof.

As is also seen in FIG. 8, because the document being previewed only has two active pages, and the resized print preview of FIG. 8 fully displays those two pages within the display area 100, the vertical scroll bar 112 becomes inactive and as a consequence, the slider 114, seen in FIGS. 3 to 7, disappears and thus is unable for user selection and scrolling.

Although not illustrated, corresponding selection of the horizontal grid line 108 and movement thereof will, according the same principles, create a similar result in altering the size of the grid and causing an alternative print preview to be displayed to the user.

Figure 9:
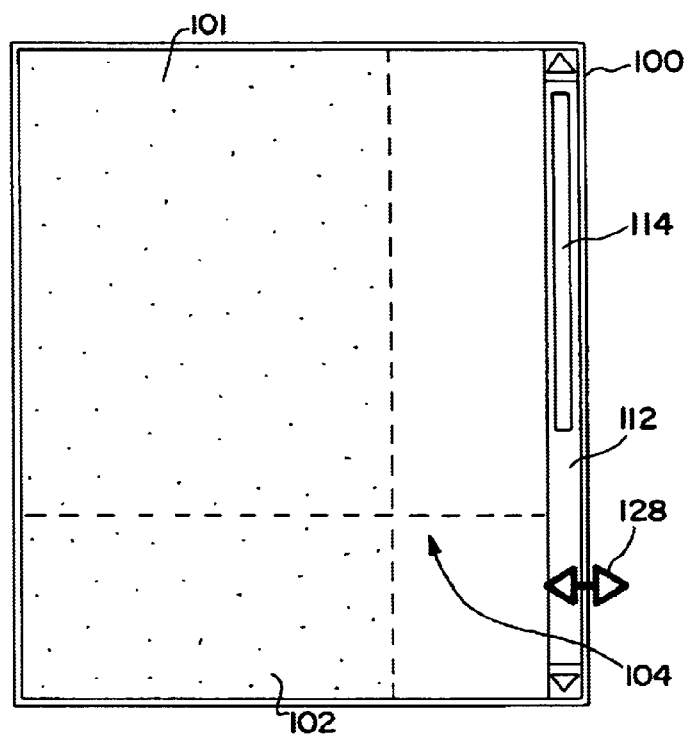
FIGS. 9 and 10 show alternative states that may be encountered through applying the preferred embodiment.
Figure 10:
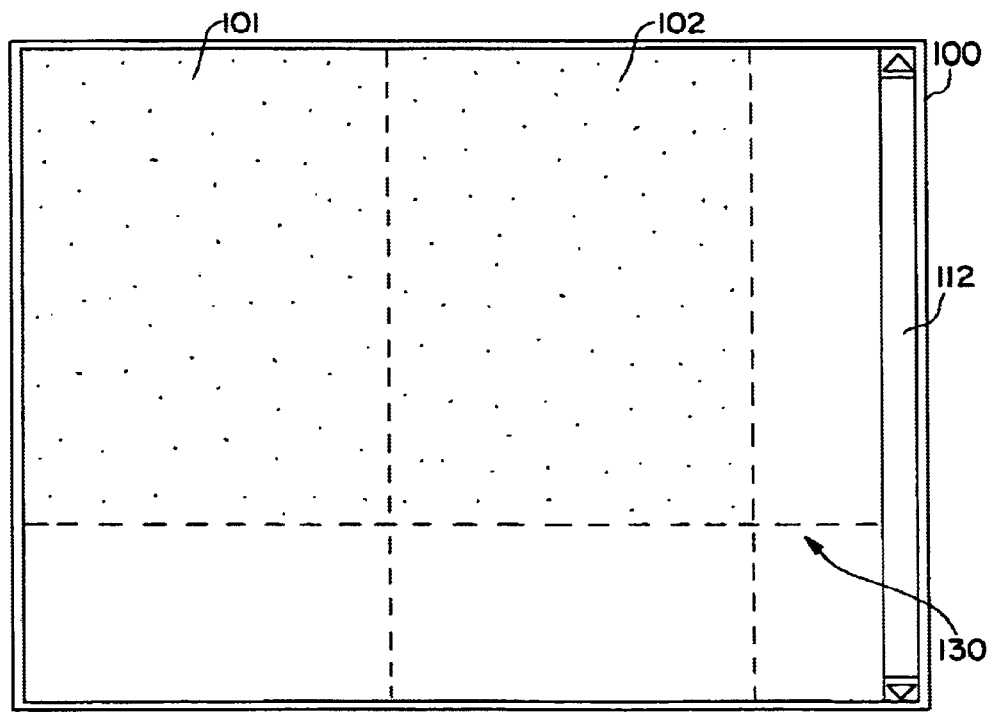

FIGS. 9 and 10 depict an alternative embodiment of the present invention based upon altering the size of the display area 100.

FIG. 9 shows an arrangement essentially corresponding to that of FIG. 5 but in this embodiment, the mouse pointer 116 is moved to hover over the edge of the display area 100 at which time is forms a double arrow pointer 128. By moving the pointer 128 in a direction to increase the size of the display area 100, directly achieves a resizing of the grid 104 to produce a new grid 130 as seen in FIG. 10 to again provide a full page preview of the page 102. It is seen from this embodiment that the relative page size (height-to-width ratio) has not changed and that the page preview of page 101 remains unchanged. If the double arrow pointer 128 were moved in a direction to reduce the size of the display area 100, the grid size reduces maintaining a print preview corresponding to that of FIG. 9, but of the corresponding reduced dimensions of the pace 101. In this fashion, resizing of the display window 100 avoids truncating or omitting portions of the print preview by resizing of the grid so as to achieve appropriate print previewing of at least one page of the document.

Further, as seen in FIG. 10, because the only two active pages of the displayed document (pages 101 and 102) are seen in the display area, the vertical scroll bar 112 again becomes inactive through omission of the slider 114.

Figure 12:
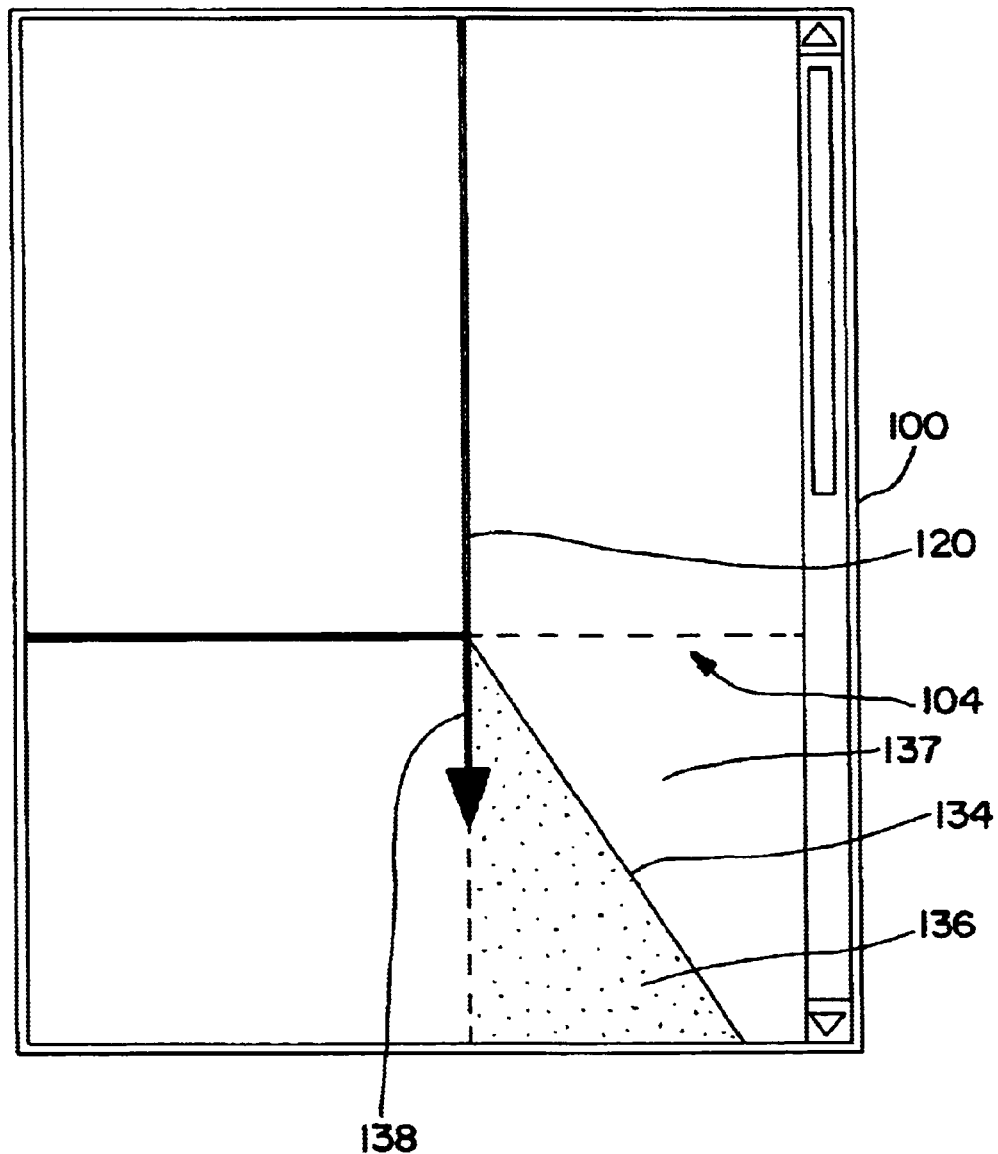
FIG. 12 illustrates how movement along the locus determines that part of the grid being directly re-sized.
Figure 13:
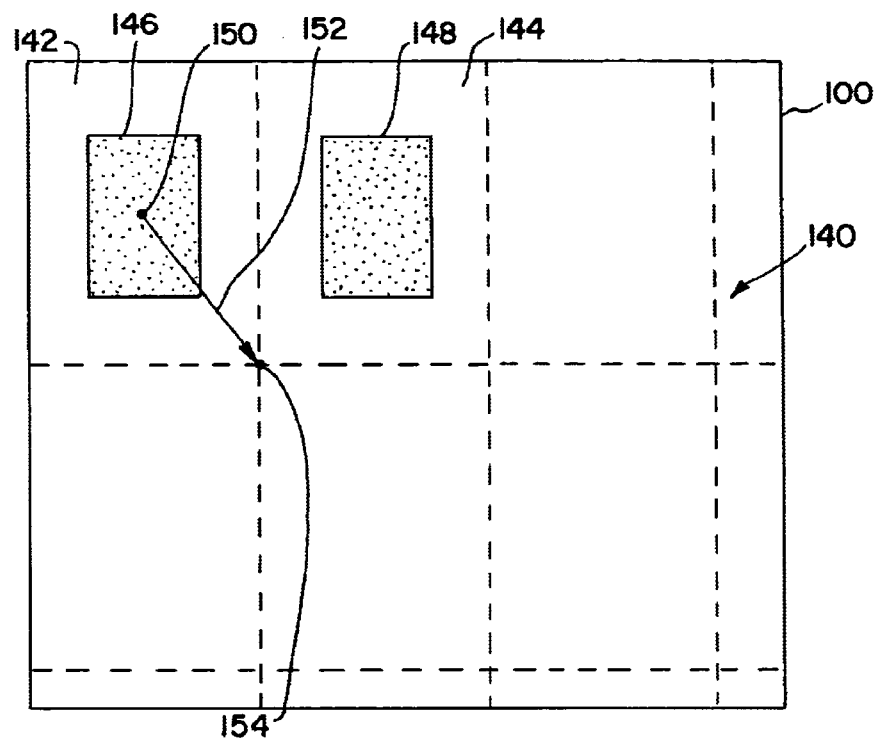
FIG. 13 depicts an alternative embodiment based upon movement of a point with the grid.
Figure 14:
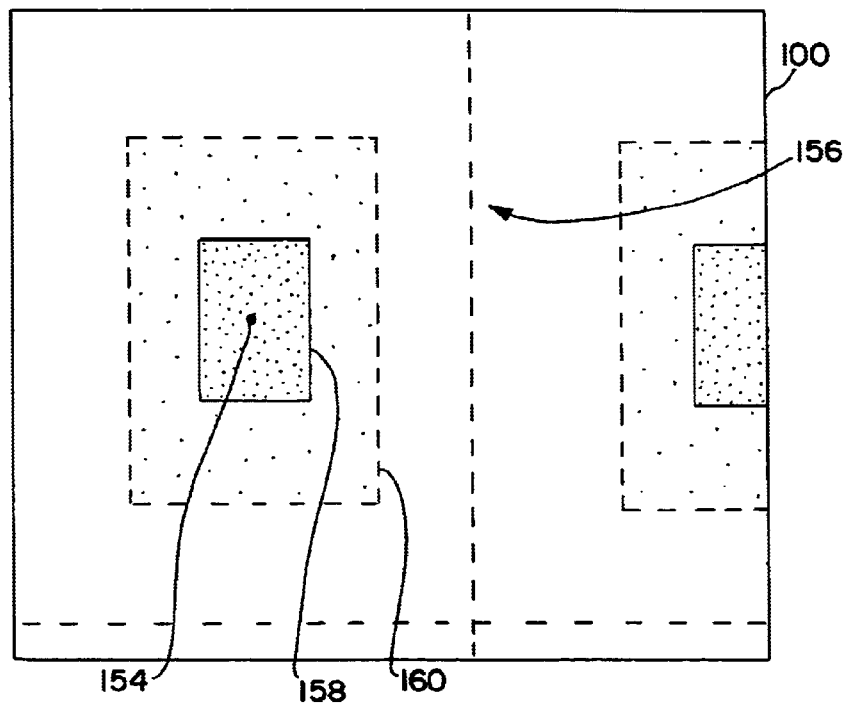
FIG. 14 depicts alternative representations derivable from the embodiment of FIG. 13.

FIG. 12 further illustrates how resizing of the grid 104 may be. implemented based on the user manipulating the grid 104. As previously discussed with reference to FIG. 6, movement along the locus 120 introduces no modification to the grid spacing of the relevant vertical or horizontal grid line. Movement transverse the relevant line causes a change in spacing between that and adjacent parallel grid line. However, as depicted in FIG. 12, movement of the mouse 43 that causes the cruciform pointer 118 to leave the locus 120 and traverse in the grid 104 in the direction of, say, the arrow 138 activates an alternate mechanism for determining the grid resizing. As the locus 120 is departed, an imaginary line 134 becomes activated to divide the adjacent grid area into two portions 136 and 137 (portion 136 being shaded in FIG. 12 for the purposes of this description). As seen, the line 134 represents a diagonal division of the grid area to the extent that, in the preferred embodiment, movement of the cruciform pointer 118 within either grid line 106 or 108 outside the locus 120 is interpreted as movement affecting the spacing of the other grid line 108 or 106 respectively. Further, in the preferred embodiment, outside of the locus 120, movement transverse the grid 104 is not permitted. As a consequence, in the preferred embodiment, essentially equal but opposite mechanisms are used for resizing the grid depending on whether the cruciform pointer 188 lies on the locus 120. FIGS. 13 and 14 depict an alternative embodiment where resizing the print preview is in response to selection and movement of a point within the grid. FIG. 13 shows a window 100 in which a print preview is displayed, where each displayable page 146, 148 is surrounded by a (non-active) border 142, 144 separated by a grid 140. This form of "border" preview is often encountered when it is desired that the previewed page not fill the entire display window 100. Such may occur in the transition form one-page to two-page previewing, or vice versa. In this embodiment, the user is enable, using the mouse 43 and the mouse pointer 116, to select any point (eg. point 150) within the window 100, and drag that point 150, in this example via a vector 152, to another point 154 within the window 100. At that time, the computer system 40 determines the extent of translation and resizes the grid to provide a new print preview. In the embodiment of FIG. 13 the point 154 represent the centre of the preview of the page 146 and is moved to the point 154 coincident with an intersection in the grid 140. As a consequence, the location of the point 150 within the window 100 becomes, in the altered print preview, the centre of the altered print preview of the page 146. This is seen in FIG. 14 where two example of the amended print preview are shown. In a first example, the amended print preview 158 remains the same size of the preview 146 whereas in the second example, the amended preview 160 increase in size proportionally with the increase in size of the grid 140 to the grid 156. Significantly, the centre of each of the previews 158 and 160 remain positioned coincident with the point 154. The grids 140 and 156 in these embodiments, although not directly manipulated by the user as in the previous embodiments, continue to perform a reference role for the user by assisting the user to interpret the relative size of the preview formed by a certain click and drag operation on a point.

The calculations performed in the preferred embodiments operate to determine the displayed grid size as a proportion of the original page size, which is then multiplied by the page size to give the new size for the amended print preview. On initiation, the grid is derived from the page size.

Although the preferred embodiments act to manipulate the grid to calculate the print preview, a slight variation allows an embodiment of the present invention to be directly applicable and useful in application packages such as those described in the introductory portion of this specification and which require the user to stipulate a specific zoom ratio for the print preview. In such an embodiment, the manipulation of the grid 140 may be used to derive a zoom ratio that may be input to the print preview engine of the relevant package (eg. Word 97) so that the print preview may be displayed directly by that package. Such an embodiment permits incorporating the benefits of the present invention into existing software packages simply through the addition of subroutines that manage the grid and mouse respectively and return to the print preview engine of the main software package a value equivalent to a user input zoom ratio.

Figure 15:
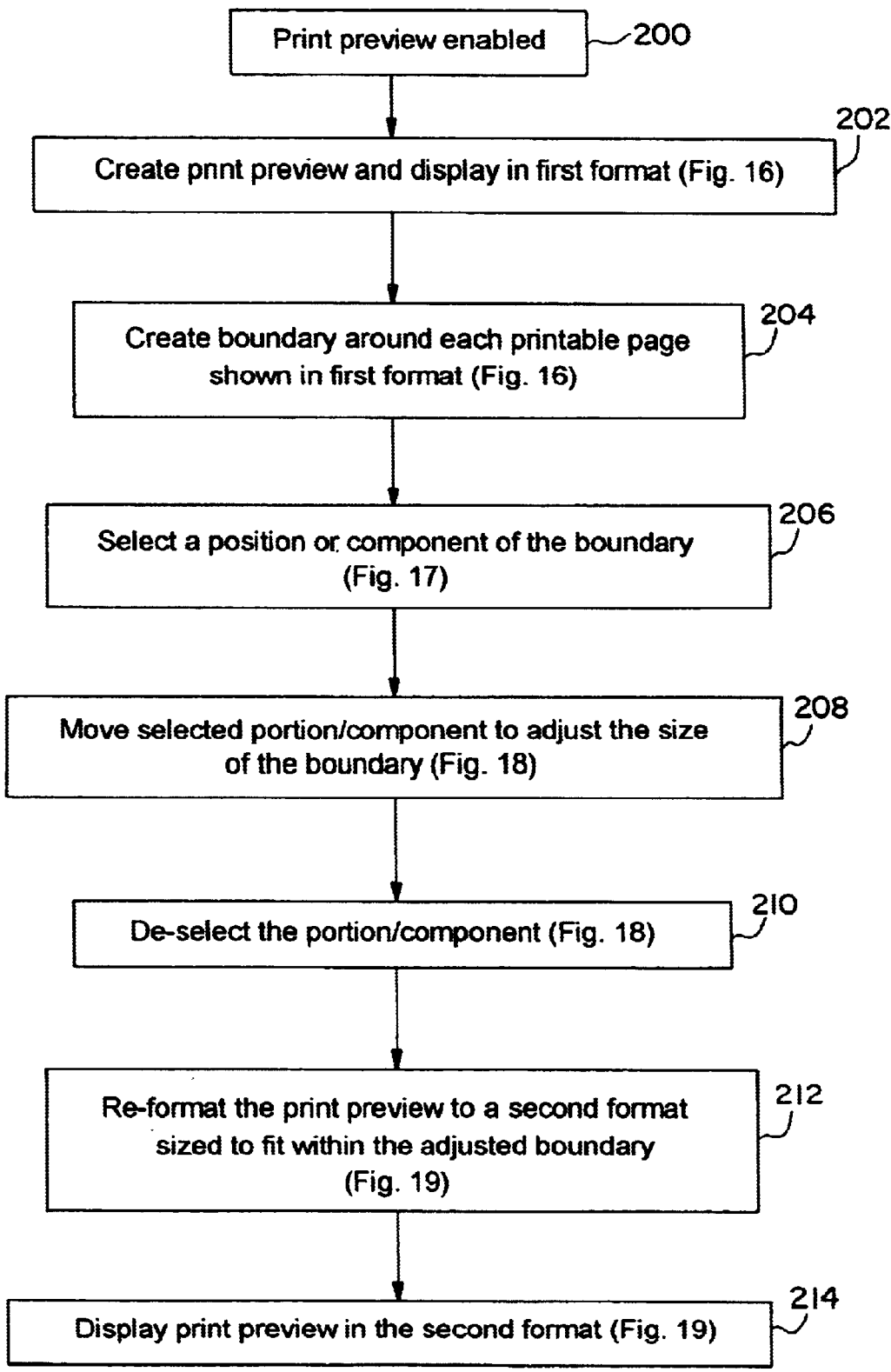
FIG. 15 is a flowchart depicting the various method steps of the preferred embodiment.

Pseudocode for these various embodiments may now be presented as follows:
    Input Variables
        cursor_position (x,y)
        default_width (W)
        default_zoom (Z)
        object_ratio (R) (height/width)
    Working Variables
        current_width (w)
        current_height (h)
        new_width (w')
        new_height (h')
    Method
        derive current_width and current_height from default_zoom, default_width and object_ratio
        $w = W \times Z$
        $h = w \times R$
        derive new_width and new_height
        $w' = x/w$
        $h' = y/h$
        calculate which of x or y movement contributes more to the new size
            If ($w' \times h > h' \times w$) [or alternately $h'/w' < R$]
                then $h' = w' \times R$
                else $w' = h'/R$
        embodiment based on grid only ends here with h' and w' that define the new grid size which is used for the new preview
        to determine the new zoom for the alternate embodiment do also
        $Z' = w'/W$ ' new zoom value being a percentage of a normal 100% zoom FIG. 15 indicates in flowchart form various method steps that perform in the preferred embodiment and which may be integrated into an application program of a larger unit (eg. a desktop publishing suite) or alternatively may be provided as one or more stand alone subroutine that may be accessed by any application program incorporating a print preview function. The method commences with step 200 where a user selection of the print preview function is detected as being enabled. At step 202, an initial print preview is created and displayed in a first format which in the preferred embodiment corresponds to the arrangement showing in FIG. 3 where at least one full page is previewed.

Although shown following consecutively from step 202, step 204 which creates a boundary around each printable page in the first format and corresponds in the preferred embodiment to the grid 104 shown in FIG. 3, may also be performed in parallel or simultaneously with step 202. Since at least one whole page is previewed in the first format, the boundary (eg. the grid 104) will thereby incorporate at least one intersection in the preview display.

Figure 16:
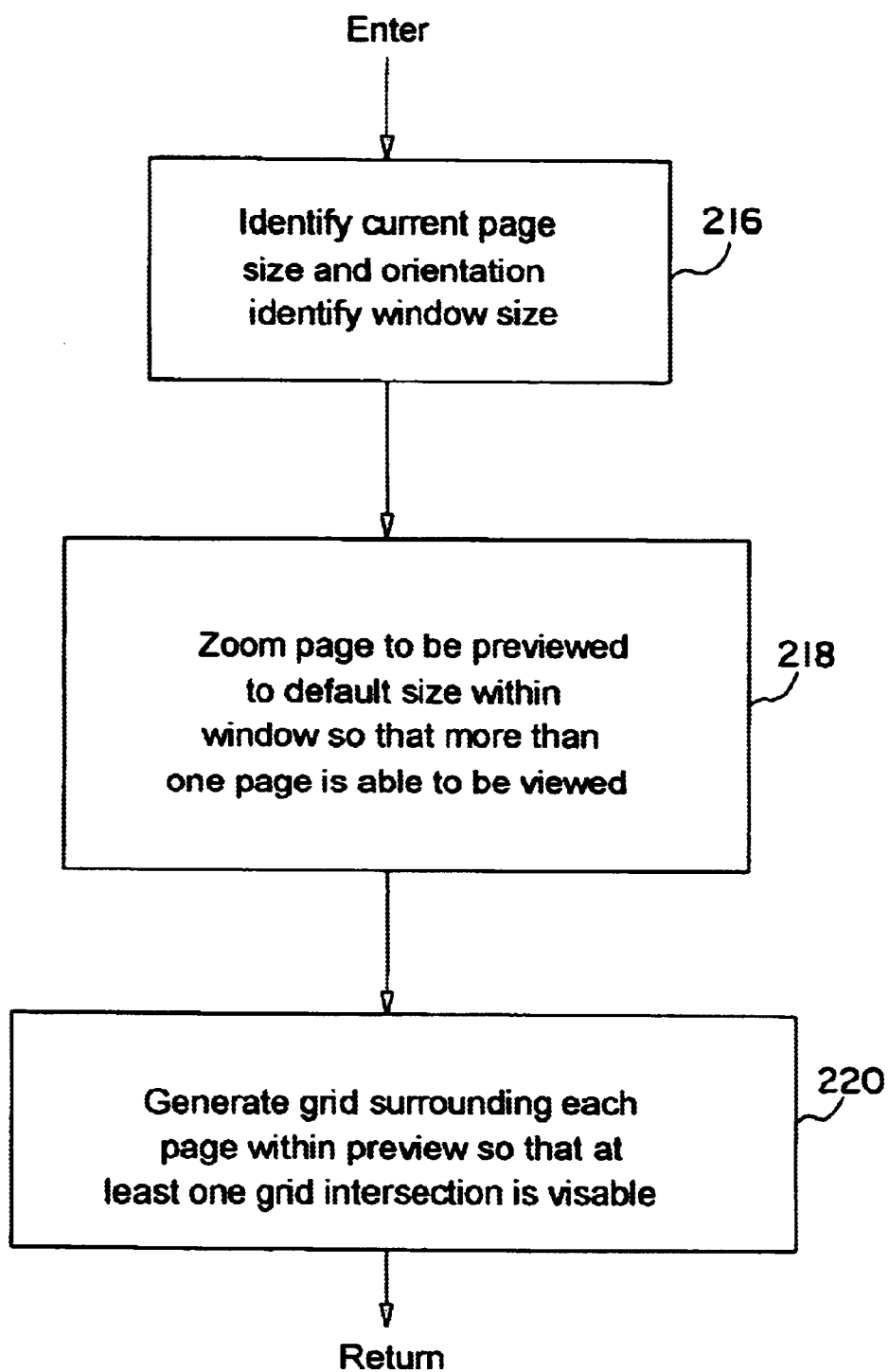
FIG. 16 is a detailed flowchart of steps 202 and 204 of FIG. 15.

Steps 202 and 204 are detailed further in FIG. 16 which commences with step 216 to identify the current page size and orientation and also to identify the Window size into which the preview is to be displayed. Next, at step 218 the page to be previewed is zoomed to a default size within the window preferably so that more than one page is able to be viewed. Next, at step 220; the grid is generated to surround each page within the preview with at least one grid intersection being visible.

Returning to FIG. 15, steps 206, 208 and 210 follow which detail the selection by the user of a position within the preview or a component of the boundary which is then moved relative to the initial boundary (of the first format) and subsequently deselected to indicate a sizing of a second format for print preview.

Figure 17:
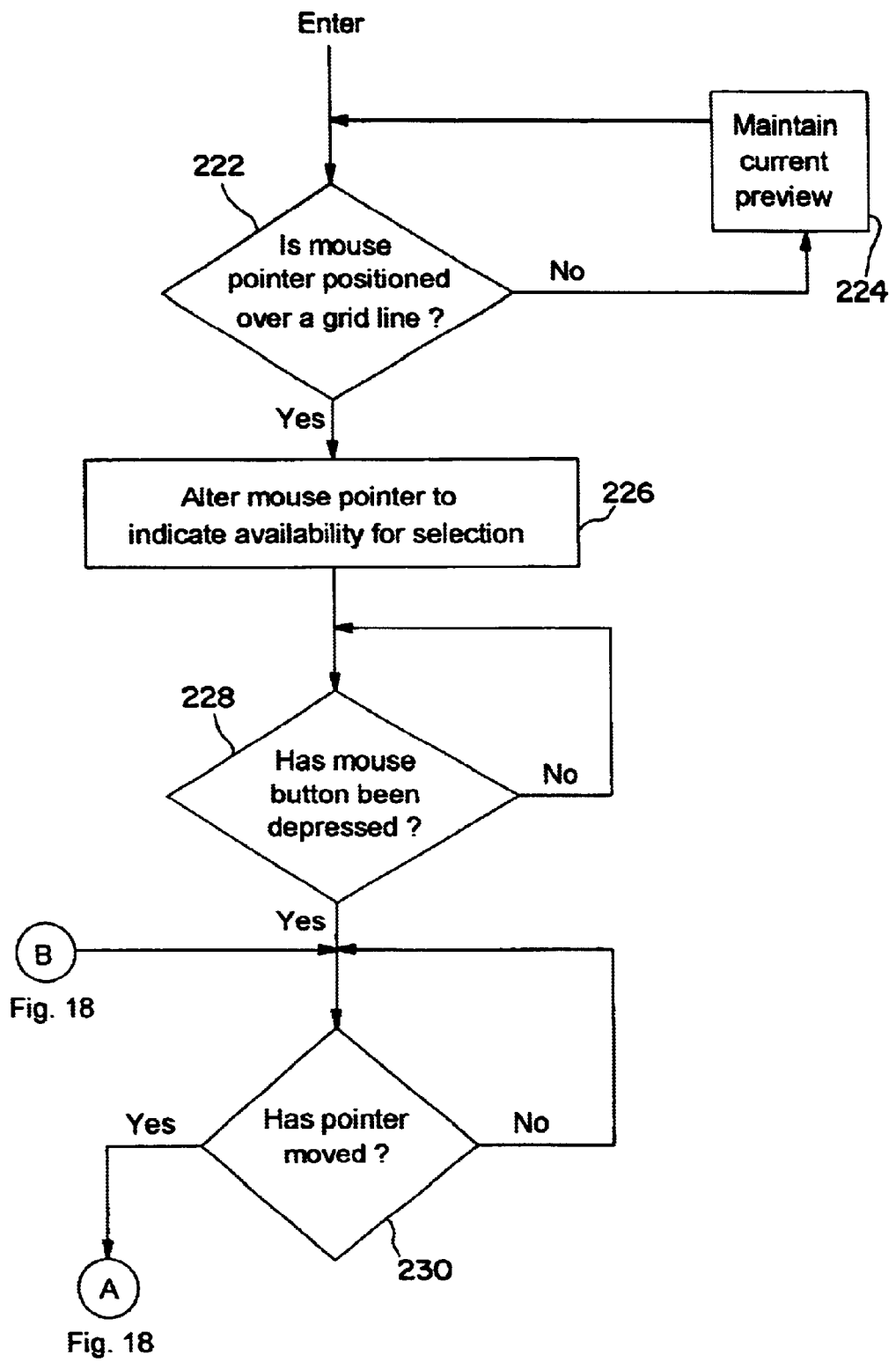
FIGS. 17 and 18 detail the steps 206, 208 and 210 of FIG. 15.
Figure 18:
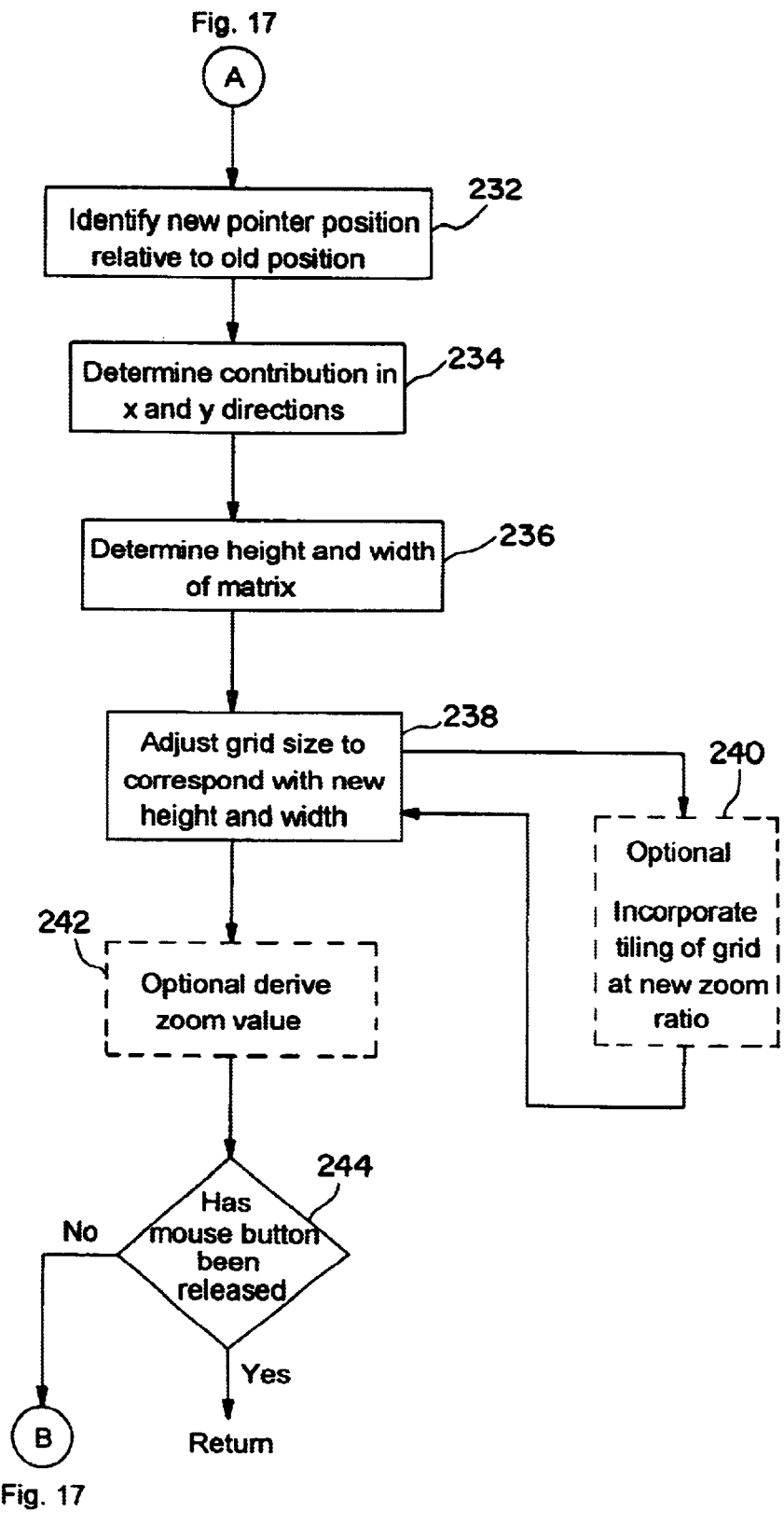

As seen in FIG. 17, for the example where the component of the boundary is selected, this commences at step 222 to determine whether or not the mouse pointer is positioned over a arid line. If the mouse is not so positioned, step 224 effectively implements a no operation that maintains the current print preview. Where the mouse is so positioned, step 226 follows which alters the representation of the mouse pointer to the user to indicate the availability of the grid line for selection. Step 228 examines whether or not the mouse button has been depressed and where this occurs, further determination is made as to whether or not the mouse pointer has moved. If such is the case and with reference to FIG. 18, step 232 identifies the new pointer position and its relationship to the old position. This is then resolved at step 234 into contributions into the x and y direction to determine in step 236 the height and width of the matrix of display cells formed by the grid. This is followed by step 238 where the grid size is adjusted to correspond with the new height and width thereby providing a new cell size for the display of preview pages. Within step 238, an optional step 240 may be performed to incorporate a tiling of the grid at the new zoom ratio. The need for tiling is dependent upon the extent of change in size of the matrix and those skilled in the art will appreciate that changes in the size of the matrix formed by the grid can result in the preview moving from a single page to a multi-page tiled arrangement or alternatively from a multi-page tiled arrangement to a single page arrangement.

After step 238, at step 242, optionally an explicit zoom value may be derived and such is appropriate in circumstances where the present invention is embodied in an application subroutine associated with a desktop publishing package, such as Word 97 as described above, Where this option is used, the option of step 240 need not be used as typically the desktop publishing package usually incorporates its own tiling routines.

Step 244 determines whether or not the mouse button has been released and if this is the case, the subroutine is returned and if not, reference is made to FIG. 17 which examines again whether or not the pointer has moved.

Figure 19:
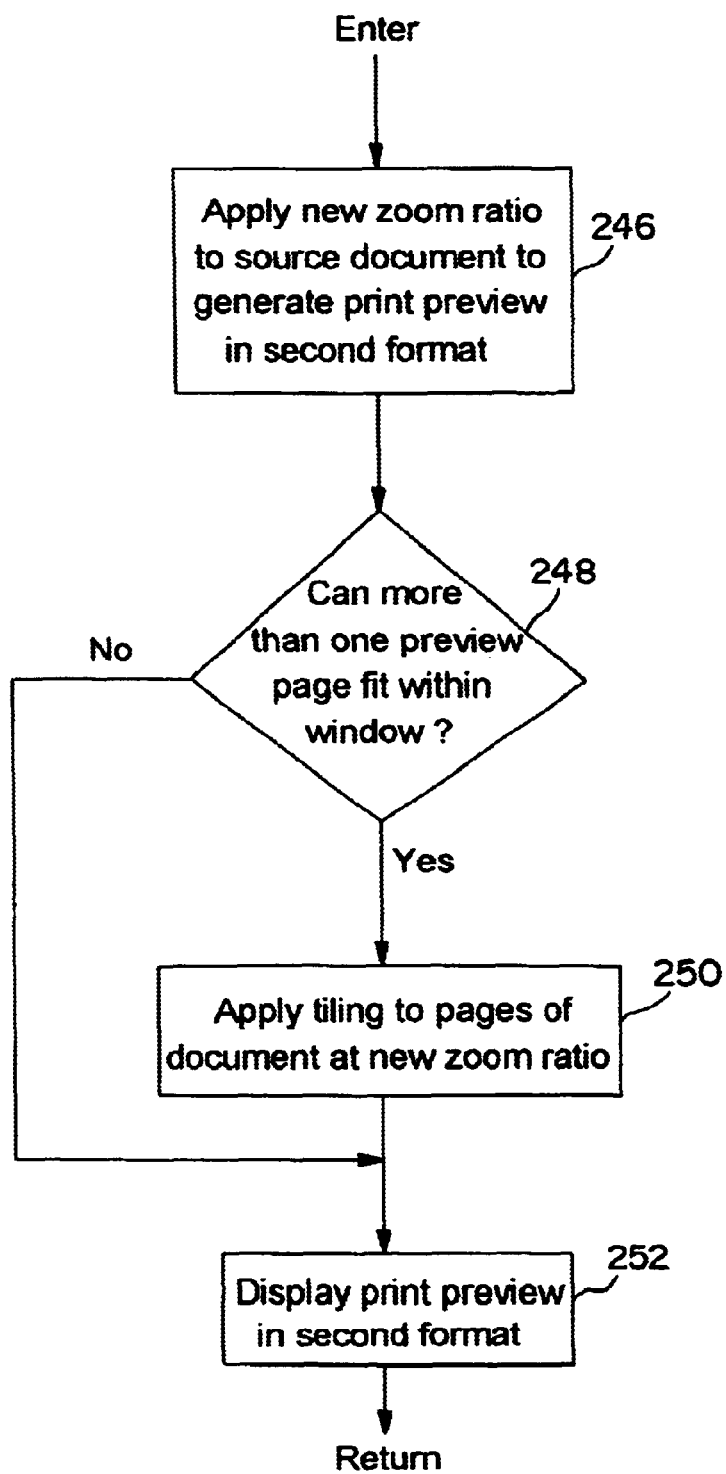
FIG. 19 details steps 212 and 214 of FIG. 15.

Returning to FIG. 15, once the mouse button has been released, step 212 is activated to reformat the print preview to a second format to fit within the adjusted boundary of the grid matrix. This is followed by step 214 where the print preview is displayed in the second format. These steps are seen in more detail in FIG. 19 which commences at step 246 that applies the new zoom ratio to the source document to generate a print preview in the second format, At step 248, a determination is made as to whether or not more than one page preview can fit within the window if such the case, step 250 follows that applies tiling to the pages in the new document at the new zoom ratio. If not, and after step 250, step 252 acts to display the print preview in the second format.

The embodiments of the invention that operate on a selected component of the print preview image (eg. FIGS. 13 and 14) operate in a corresponding manner excepting that whilst the grid is not actively moved, the relative position of a point within the grid and window is assessed to determine the extent of change in zoom of the print preview display.

Further, as an extension to the embodiments of FIGS. 13 and 14, the initial print preview may be presented at a magnification that exceeds the window size such that when a portion of the displayed image is selected, the grid snaps to a size within the window and smaller than the visual object, of which the displayed image forms a part. Movement of the selected portion adjusts the grid accordingly with the window so that when deselection occurs, the preview associates with the grid size.

It will be apparent from the foregoing that a print preview arrangement is disclosed in which at least one full print preview page is displayed irrespective of the size of the display window in which the print preview is generated. Further, the arrangement provides for the user to conveniently manipulate the actual print preview size as desired relative to the size of the display area and the number of pages desired to be previewed. This is achieved without the user selecting any predetermined zoom ratio and/or undue experimentation as to a desired zoom size. By merely clicking and dragging the grid to a desired location achieves an automatic resizing of the grid sufficient to preview a display one or more pages of the electronic document in an appropriate individual or tiled form. Thus, the grid provides direct means by which the preview size may be determined. This resizing automatically takes account of the page dimensions and is thus one that is able to be implemented irrespective of the output page size (em. A4. or Foolscap).

The foregoing describes only a number of embodiments of the present invention and modifications may be made thereto without departing from the spirit and scope of the present invention.

For example, although the above describes displaying the altered print preview once the grid has been changed and the mouse unclicked, the print preview may alternatively be updated and resized as the grid is moved. Whilst such will provide the user with immediate feedback as to the appearance of the print preview, such also attracts a high computational overhead.

I claim:

1. A method of altering the image presentation of a visual object comprising one or more object components arranged in a predetermined layout, said method comprising the steps of:
    establishing a matrix of display cells in a first configuration within at least one of which the visual object is displayable;
    selecting a component of the image presentation at a first position within the matrix and moving the component to a second position in the matrix;
    determining from the movement of the component an extent of change of the first configuration; and
    applying the extent of change to the matrix of display cells to alter the image presentation of the visual object to a second configuration while maintaining the predetermined layout of the object components.

2. A method according to claim 1, wherein the display cells are smaller than the visual object and the second position lies within the image presentation.

3. A method according to claim 1, wherein the matrix is visible within the image presentation and defines boundaries of the display cells.

4. A method according to claim 3, wherein the boundaries form a grid.

5. A method according to claim 3, wherein the selected component comprises one of the boundaries.

6. A method according to claim 1, wherein the selected component comprises a point location within one of the cells.

7. A method according to claim 1, wherein the visual object comprises an electronic document and the first configuration comprises a first print preview display of the electronic document in which each of the display cells corresponds to a printable page of the document and the second configuration comprises a second print preview display, different from the first, of the electronic document.

8. A method of previewing an electronic document intended for printing, said method comprising the steps of:

providing an electronic document having a predetermined layout and at least one printable page;

creating a print preview representation of the one page and displaying the representation in a first format on a display;

creating a boundary at an edge of the one page and displaying the boundary over the representation; and selecting a component of the representation and moving the component within the display to cause an alteration of the representation of the one page to a second format while maintaining the predetermined layout of the electronic document.

9. A method according to claim 8, wherein the first format includes a first tiling of a plurality of printable pages of the document and the second format includes a second tiling, different from the first, of the plurality of pages.

10. A method according to claim 9, wherein the first and second tilings include the same relative positioning between pages in the respective formats.

11. A method according to claim 9, wherein the first and second tilings include different relative positioning between pages in the formats.

12. A method according to claim 9, wherein each tiling includes an integral number of pages in a first display direction.

13. A method according to claim 8, wherein at least one page not displayed entirely by the tiling is viewable via scrolling in a second display direction.

14. A method according to claim 8, wherein said creating steps are substantially simultaneously performed.

15. A method according to claim 8, wherein said creating steps are unitarily performed.

16. A method according to claim 8, wherein the alteration comprises a proportional resizing of the boundary and a consequential corresponding resizing of the one page to the second format and each other of the pages to the second format.

17. A method according to claim 8, wherein the component comprises part of the boundary.

18. A method according to claim 17, wherein the boundary comprises orthogonally arranged portions and the selected one of the portions requires movement in a direction parallel to the other of the portions to cause resizing of the boundary and the page.

19. A method according to claim 8, wherein the boundary comprises part of an orthogonally arranged grid that extends beyond the one page in the first format, and the component comprises part of the grid not forming part of the boundary of the one page, and the movement of the component requires movement in a direction aligned with the component to cause resizing of the boundary and the page.

20. A method according to claim 8, wherein the component comprises a window boundary within which the print preview representation is displayed.

21. A method according to claim 20, wherein a display page size within the print preview representation is maintained between the first and second formats.

22. A method of previewing an electronic document intended for printing using a display device forming part of a computer system, said method comprising the steps of:

(a) providing an electronic document having at least one printable page;

(b) forming a print preview representation of the one page at a default preview size;

(c) forming a grid associated with the representation and having cells corresponding to individual pages at the default preview size;

(d) displaying on the display device the representation and the grid with the grid overlying the representation;

(e) selecting, using at least one input device of the computer system, a part of the grid and moving the selected part to cause a change in size of the grid such that an aspect ratio of the cells formed by the grid remains constant; and (f) de-selecting the grid and forming a further print preview representation of the one page at a preview size corresponding to that of the change in the grid.

23. A method according to claim 22, comprising the further step, after step (f), of:

(g) iteratively repeating steps (e) and (f) until the displayed print preview is of a desired representation.

24. Apparatus for altering the image presentation by a display of a visual object comprising one or more object components arranged in a predetermined layout, said apparatus comprising:

means for establishing a matrix of display cells in a first configuration within at least one of which said visual object is displayable;

means for selecting a component of said image presentation at a first position within said matrix and moving said component to a second position in said matrix;

means for determining from the movement of said component an extent of change of said first configuration; and means for applying the extent of change to the matrix of display cells to alter the image presentation of said visual object to a second configuration whilst maintaining said pre-determined layout of said object components.

25. Apparatus according to claim 24, wherein said second position lies within said image presentation and said matrix is visible within said image presentation and defines boundaries of said display cells.

26. Apparatus according to claim 25, wherein said boundaries form a grid.

27. Apparatus according to claim 25, wherein said selected component comprises one of said boundaries.

28. Apparatus according to claim 24, wherein said selected component comprises a point location within one of said cells.

29. Apparatus according to claim 24, wherein said visual object comprises an electronic document and said first configuration comprises a first print preview display of said electronic document in which each of said display cells corresponds to a printable page of said document and said second configuration comprises a second print preview display, different from the first, of said electronic document.

30. Apparatus for previewing an electronic document intended for printing, said apparatus comprising:

means for providing an electronic document having a predetermined layout and at least one printable page;

means for creating a print preview representation of at least said one page and displaying the representation in a first format;

means for creating a boundary at an edge of said one page and displaying said boundary over said representation; and means for selecting a component of the representation and moving the component within the display to cause an alteration of said representation of said one page to a second format whilst maintaining said predetermined layout of said electronic document.

31. Apparatus according to claim 30, wherein said first format includes a first tiling of a plurality of printable pages of said document and said second format includes a second tiling, different from the first, of said plurality of pages.

32. Apparatus according to claim 31, wherein said first and second tilings include the same relative positioning between pages in the respective formats.

33. Apparatus according to claim 31, wherein said first and second tilings include different relative positioning between pages in the formats.

34. Apparatus according to claim 31, wherein each said tiling includes an integral number of pages in a first display direction.

35. Apparatus according to claim 30, wherein at least one page not displayed entirely by said tiling is viewable via scrolling in a second display direction.

36. Apparatus according to claim 30, wherein said means for creating said print preview representation and said means for creating said boundary operate substantially simultaneously.

37. Apparatus according to claim 30, wherein said means for selecting said component implements a proportional resizing of the boundary and a consequential corresponding resizing of said one page to said second format and each other of said pages to said second format.

38. Apparatus according to claim 30, wherein said component comprises part of said boundary.

39. Apparatus according to claim 38, wherein said boundary comprises orthogonally arranged portions and said selected one of said portions requires movement in a direction parallel to the other of said portions to cause resizing of said boundary and said page.

40. Apparatus according to claim 30, wherein said boundary comprises part of an orthogonally arranged grid that extends beyond said one page in said first format, and said component comprises part of said grid not forming part of said boundary of said one page, and said movement of said component requires movement in a direction aligned with said component to cause resizing of said boundary and said page.

41. Apparatus according to claim 30, wherein said component comprises a window boundary within which said print preview representation is displayed.

42. Apparatus according to claim 41, wherein a display page size within said print preview representation is maintained between said first and second formats.

43. Apparatus for previewing an electronic document intended for printing using a display device forming part of a computer system, said apparatus comprising:
   a source of said electronic document, said electronic document having at least one printable page;
   print preview means for forming a print preview representation of said one page at a default preview size;
   grid means for forming a grid associated with said print preview representation and having cells corresponding to individual pages at said default preview size;
   display means for displaying on said display device said print preview representation and said grid with said grid overlying said print preview representation;
   selecting means for selecting, using at least one input device of said computer system, a part of said grid and moving the selected part to cause a change in size of said grid such that an aspect ratio of said cells formed by said grid remains constant; and
   de-selecting means for de-selecting said grid and forming a further print preview representation of said one page at a preview size corresponding to that of said change in said grid.

44. A computer readable medium incorporating a computer program product for altering the image presentation of a visual object comprising one or more object components arranged in a predetermined layout, said computer program product comprising:
   means for establishing a matrix of display cells in a first configuration within at least one of which said visual object is displayable;
   means for selecting a component of said image presentation at a first position within said matrix and moving said component to a second position in said matrix;
   means for determining from the movement of said component an extent of change of said first configuration; and
   means for applying the extent of change to the matrix of display cells to alter the image presentation of said visual object to a second configuration whilst maintaining said pre-determined layout of said object components.

45. A computer readable medium according to claim 44, wherein said second position lies within said image presentation and said matrix is visible within said image presentation and defines boundaries of said display cells.

46. A computer readable medium according to claim 45, wherein said boundaries form a grid.

47. A computer readable medium according to claim 45, wherein said selected component comprises one of said boundaries.

48. A computer readable medium according to claim 44, wherein said selected component comprises a point location within one of said cells.

49. A computer readable medium according to claim 44, wherein said visual object comprises an electronic document and said first configuration comprises a first print preview display of said electronic document in which each of said display cells corresponds to a printable page of said document and said second configuration comprises a second print preview display, different from the first, of said electronic document.

50. A computer readable medium incorporating a computer program product for previewing an electronic document intended for printing, said computer program product comprising:
   means for providing an electronic document having a predetermined layout and at least one printable page;
   means for creating a print preview representation of at least said one page and displaying the representation in a first format on a display;
   means for creating a boundary at an edge of said one page and displaying said boundary over said representation; and
   means for selecting a component of the representation and moving the component within the display to cause an alteration of said representation of said one page to a second format whilst maintaining said pre-determined layout of said electronic document.

51. A computer readable medium according to claim 50, wherein said first format includes a first tiling of a plurality of printable pages of said document and said second format includes a second tiling, different from the first, of said plurality of pages.

52. A computer readable medium according to claim 51, wherein said first and second filings include the same relative positioning between pages in the respective formats.

53. A computer readable medium according to claim 51, wherein said first and second tilings include different relative positioning between pages in the formats.

54. A computer readable medium according to claim 51, wherein each said tiling includes an integral number of pages in a first display direction.

55. A computer readable medium according to claim 50, wherein at least one page not displayed entirely by said tiling is viewable via scrolling in a second display direction.

56. A computer readable medium according to claim 50, wherein said means for creating said print preview representation and means for creating said boundary operate substantially simultaneously.

57. A computer readable medium according to claim 50, wherein said means for selecting said component implements a proportional resizing of the boundary and a consequential corresponding resizing of said one page to said second format and each other of said pages to said second format.

58. A computer readable medium according to claim 50, wherein said component comprises part of said boundary.

59. A computer readable medium according to claim 58, wherein said boundary comprises orthogonally arranged portions and said selected one of said portions requires movement in a direction parallel to the other of said portions to cause resizing of said boundary and said page.

60. A computer readable medium according to claim 50, wherein said boundary comprises part of an orthogonally arranged grid that extends beyond said one page in said first format, and said component comprises part of said grid not forming part of said boundary of said one page, and said movement of said component requires movement in a direction aligned with said component to cause resizing of said boundary and said page.

61. A computer readable medium according to claim 50, wherein said component comprises a window boundary within which said print preview representation is displayed.

62. A computer readable medium according to claim 61, wherein a display page size within said print preview representation is maintained between said first and second formats.

63. A computer readable medium incorporating a computer program product for previewing an electronic document using a display device forming part of a computer system, said computer program product comprising:

source means for providing said electronic document, said electronic document having at least one printable page;

print preview means for forming a print preview representation of said one page at a default preview size;

grid means for forming a grid associated with said print preview representation and having cells corresponding to individual pages at said default preview size;

display means for displaying on said display device said print preview representation and said grid with said grid overlying said print preview representation;

selecting means for selecting, using at least one input device of said computer system, a part of said grid and moving the selected part to cause a change in size of said grid such that are aspect ratio of said cells formed by said grid remains constant; and de-selecting means for de-selecting said grid and forming a further print preview representation of said one page at a preview size corresponding to that of said change in said grid.

* * * * *

UNITED STATES PATENT AND TRADEMARK OFFICE
CERTIFICATE OF CORRECTION

PATENT NO. : 6,694,487 B1
DATED : February 17, 2004
INVENTOR(S) : Eyal David Ilsar It is certified that error appears in the above-identified patent and that said Letters Patent is hereby corrected as shown below:

Column 2,
Line 22, "is a " should read -- is --.

Column 3,
Line 22, "is" should read -- are --; and
Line 25, "same, are also disclosed." should read -- same . --.

Column 4,
Line 22, "13" should read -- 30 --.

Column 5,
Line 67, "118" should read -- 118, he or she --.

Column 6,
Line 32, "100," should read -- 100, the user --;
Line 42, "pace" should read -- page --; and
Line 51, "be." should read -- be --.

Column 7,
Line 9, "FIGS. 13" should read -- ¶ FIGS. 13 --;
Line 19, "enable," should read -- enabled, --;
Line 27, "represent" should read -- represents --; and
Line 32, "example" should read -- examples --.

Column 8,
Line 37, "subroutine" should read -- subroutines --.

Column 9,
Line 4, "arid" should read -- grid --; and
Line 48, "window if" should read -- window, and if --.

Column 10,
Line 9, "By merely" should read -- Merley --; and
Line 17, "(em. A4." should read -- (e.g., A4, --.

UNITED STATES PATENT AND TRADEMARK OFFICE
CERTIFICATE OF CORRECTION

PATENT NO. : 6,694,487 B1
DATED : February 17, 2004
INVENTOR(S) : Eyal David Ilsar It is certified that error appears in the above-identified patent and that said Letters Patent is hereby corrected as shown below:

Column 16,
Line 24, "are" should read -- an --.

Signed and Sealed this

Twenty-seventh Day of July, 2004

JON W. DUDAS
*Acting Director of the United States Patent and Trademark Office*